Oct. 16, 1962   E. H. ANDRUS   3,058,562
CREEP DRIVE CONTROL
Filed March 17, 1960   2 Sheets-Sheet 2

INVENTOR.
EVERETT H. ANDRUS
BY
RICHEY, McNENNY & FARRINGTON
William J. Flynn
ATTORNEYS

3,058,562
CREEP DRIVE CONTROL
Everett H. Andrus, Berea, Ohio, assignor to Fawick Corporation, Cleveland, Ohio, a corporation of Michigan
Filed Mar. 17, 1960, Ser. No. 15,745
8 Claims. (Cl. 192—106)

This invention relates to a creep drive control for selectively establishing and maintaining reduced speed operation of a driven member by controlling a high torque, fluid-operated clutch or brake.

There are numerous situations where it is desired to provide an inching or creep drive to a driven shaft which is coupled to a constant speed driving shaft through a fluid-operated friction clutch, particularly an air clutch. For example, such a creep drive arrangement may be required for the precision stopping of a machine tool or the like, where it is necessary to reduce the speed as the tool approaches its final position, or to control the tension on a paper web in a paper-making machine, or to control the operation of apparatus for drawing copper or brass tubing.

Prior to the present invention, the common practice in such situations has been for the operator to attempt to control manually the operation of the air clutch by selectively adjusting its internal pressure, so as to establish the desired degree of slippage between the driving and driven shafts. As a practical matter, using manual control it has not been possible to establish a precisely controlled, constant reduced speed of the driven shaft. Rather, an intermittent or start-and-stop drive was produced, which did not give the desired degree of precision. Moreover, if there happened to be a low load or zero load on the driven shaft, the driven shaft would tend to run away, even with the manually-operated reduced pressure acting on the clutch.

The present invention is directed to a novel creep drive arrangement which avoids these difficulties and which constitutes an entirely practical and relatively inexpensive arrangement for selectively operating the driven shaft at a reduced speed.

Accordingly, it is an object of this invention to provide a novel and improved creep drive arrangement for selectively establishing virtually any desired reduced speed of a driven shaft operated by a higher speed driving shaft.

It is also an object of this invention to provide such a creep drive arrangement which insures that the driven shaft cannot run away, even in the event of a low load or zero load on it.

Another object of this invention is to provide such a creep drive arrangement which may be adjusted precisely to provide the desired reduced speed of the driven shaft, regardless of the load thereon.

Another object of this invention is to provide such a creep drive arrangement which is essentially entirely fluid operated, requiring no expensive and complicated electrical controls.

Another object of this invention is to provide such a creep control arrangement which is particularly well-suited for selectively controlling the slippage in a heavy duty air clutch.

Another object of this invention is to provide such a creep control arrangement which is entirely automatic in its operation.

Further objects and advantages of this invention will be apparent from the following detailed description of a presently-preferred embodiment thereof, which is illustrated schematically in the accompanying drawings.

Figure 1:
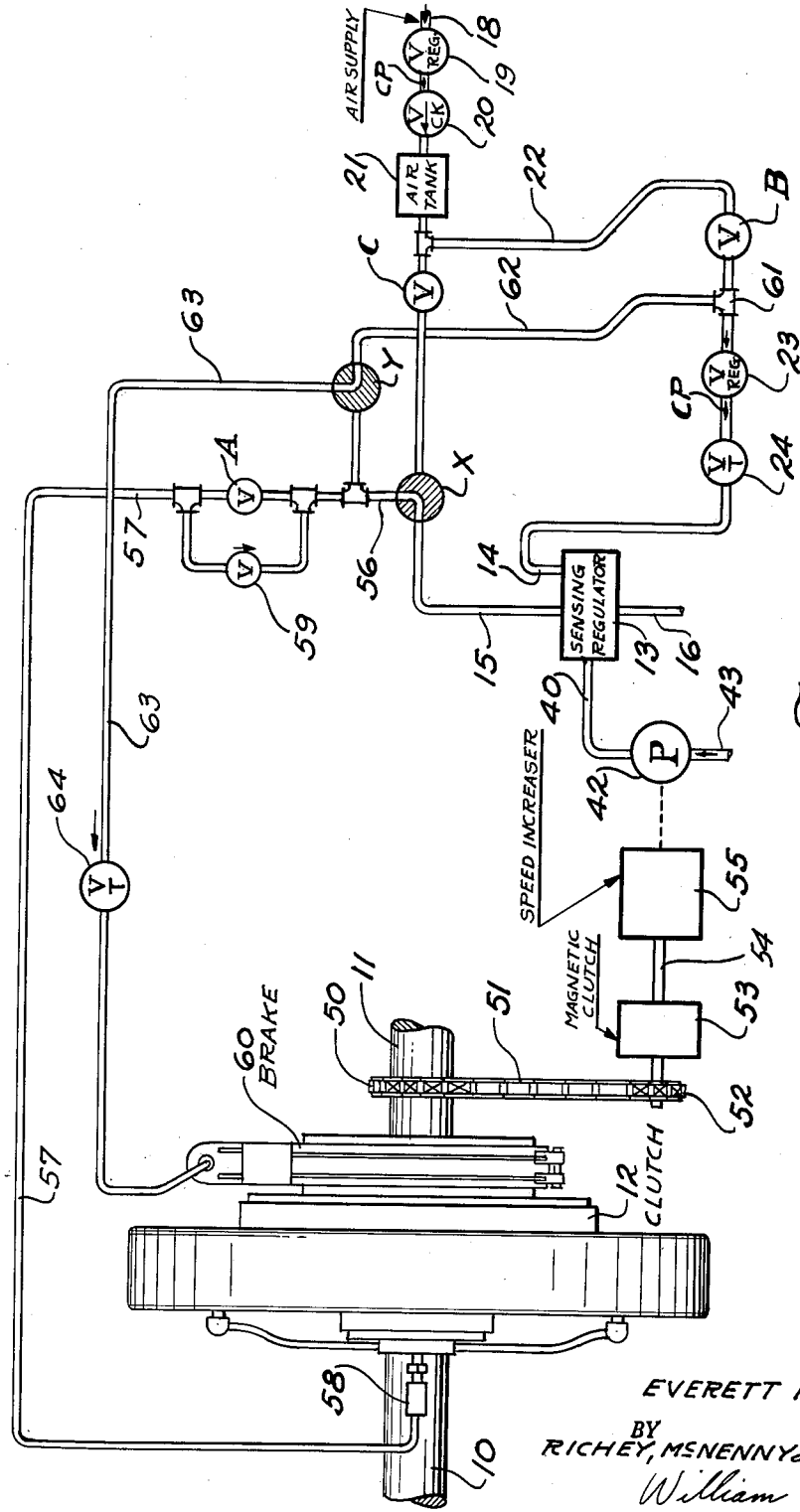
FIG. 1 is a schematic view showing a complete pneumatically-operated drive arrangement in accordance with the present invention.

Referring first to FIG. 1, the creep drive arrangement of the present invention is shown in conjunction with a rotary input or driving shaft 10 and a rotary driven or output shaft 11. An air-operated clutch 12 of any suitable design, the details of which form no part of the present invention, is provided for coupling the driving shaft 10 to the driven shaft 11. In one practical embodiment, this clutch is provided with wear shoes (not shown) which act frictionally against the driven shaft 11 to apply the torque of the drive shaft 10 thereto. The internal pressure in the clutch 12 determines the amount of torque applied to the driven shaft 11. That is, when the internal air pressure in the clutch 12 is reduced below a predetermined value, there will be a corresponding degree of slippage between the driving and driven shafts, so that the driven shaft will rotate at a reduced speed. In operation, the drive shaft 10 will rotate at some predetermined constant speed, such as 400 or 600 r.p.m.

In accordance with the present invention the air pressure in the clutch 12, and thus the speed of the driven shaft 11, is under the control of a sensing regulator designated generally by the reference numeral 13 in FIG. 1. Referring to this figure, the sensing regulator 13 is provided with an air inlet 14, an air outlet 15 leading to the clutch 12, and an exhaust outlet 16. The air inlet 14 to the creep control 13 is connected to a suitable supply 18 of air under pressure through a pressure regulator 19, a check valve 20, an air tank 21, a branch 22, a shut-off valve B, a pressure regulator 23, and a flow adjustment or metering valve 24. The pressure regulator 23 is adjusted to provide a suitable constant air pressure leading into the metering valve 24. The metering valve 24 is suitably pre-set to control the volumetric flow rate to the sensing regulator air inlet 14 at the particular pressure determined by the pressure regulator 23.

Figure 2:
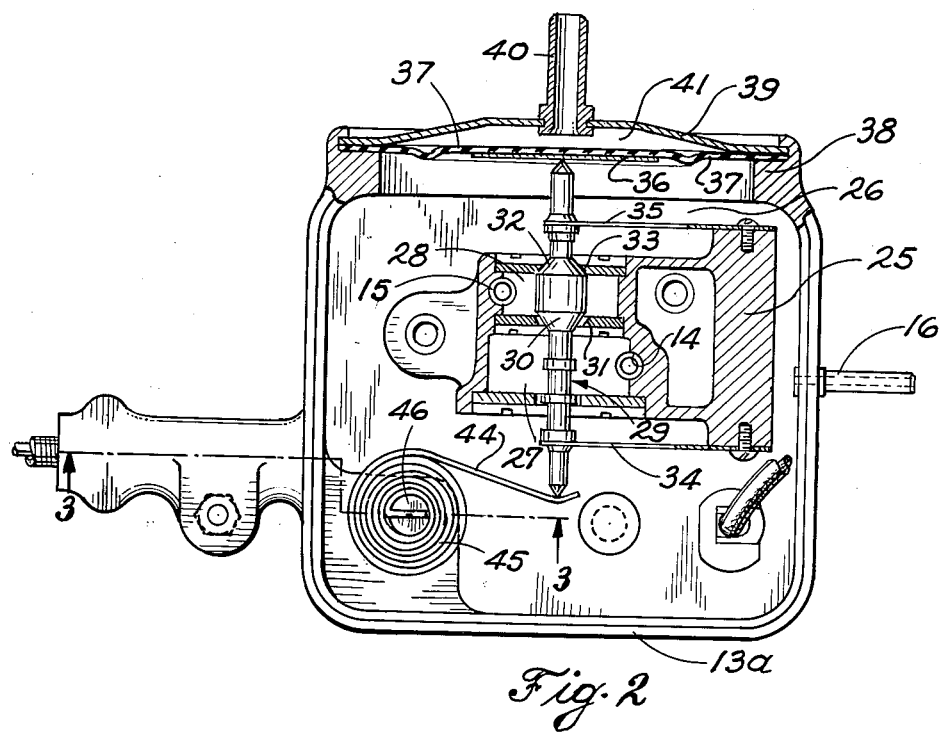
FIG. 2 is a section taken through a sensing regulator of known design which is used in the present system.
Figure 3:
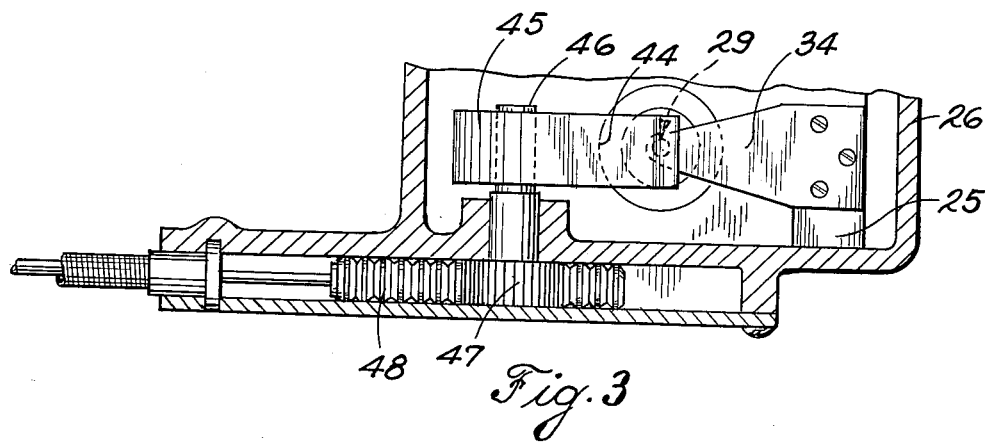
FIG. 3 is a section taken along the line 3—3 in FIG. 2.

FIGURES 2 and 3 show a valve arrangement of known design which may be used as the sensing regulator 13 in the system of the present invention. While this particular valve arrangement is shown because of its proven suitability for this purpose, it is to be understood that any other valve arrangement capable of performing the same functions in essentially the same manner may be substituted in its place in the present system, if desired.

Referring to FIG. 2, the sensing regulator 13 includes a valve body 25 fixedly mounted in a chamber 26 within the housing 13a of the sensing regulator. The air inlet line 14 leads into an inlet chamber 27 in this valve body, while the air outlet line 15 communicates with an outlet chamber 28 in the valve body.

A needle valve, designated in its entirety by the reference numeral 29, controls the communication between the inlet and outlet chambers 27 and 28 in the valve body. To this end, the needle valve is provided with a first frusto-conical valve portion 30 which is adapted to seat against a complementary-shaped valve seat 31 located between the inlet and outlet chambers 27 and 28.

At the opposite end of the valve outlet chamber 28 the needle valve is provided with a second, oppositely-facing frusto-conical portion 32 which is adapted to seat against a complementary valve seat 33, and which controls the communication between the valve outlet chamber 28 and the chamber 26 in the housing 13a of the sensing regulator. The exhaust line 16 communicates with this chamber 26, so that when the needle valve is unseated from the valve seat 33, air is permitted to flow from the valve outlet chamber 28 into the chamber 26 in the sensing regulator housing 13a and thence to the atmosphere through the exhaust line 16.

The arrangement is such that when the second frusto-conical valve portion 32 on the needle valve 29 is fully seated against the valve seat 33, the first frusto-conical valve portion 30 is unseated from its valve seat 31, so that air flows through the inlet line 14 into the valve inlet chamber 27 and past the valve portion 30 into the valve outlet chamber 28 and thence to the outlet line 15, which leads to the clutch 12. Conversely, when the frusto-conical valve portion 30 is fully seated against its valve seat 31, the other frusto-conical valve portion 32 is unseated from its valve seat 33, permitting air to flow from the valve outlet chamber 28 past the valve portion 32 and into the chamber 26 and thence to the atmosphere through line 16.

An important aspect of the system of the present invention is that the sensing regulator 13 has a flow capacity greater than that of the metering valve 24. Thus, when the needle valve 29 in the sensing regulator 13 is positioned to establish the maximum communication between air inlet 14 and air outlet 15, the sensing regulator imposes no limitation on the rate at which air can flow to the clutch 12. This is determined solely by the metering valve 24. Conversely, in certain positions of the needle valve 29 in the sensing regulator 13, the communication between the clutch air line 15 and the exhaust line 16 is such that it can bleed off air from the clutch 12 faster than it is being supplied by the metering valve 24, so that the internal air pressure in the clutch will decrease.

A pair of leaf springs 34 and 35, which are cantilever-mounted on opposite ends of the valve body 25, are attached to the needle valve 29 at the opposite ends of the valve body. These leaf springs normally bias the needle valve to a position in which its frusto-conical valve portion 30 is fully seated against the valve seat 31 and the other frusto-conical valve portion 32 is unseated from its valve seat 33.

At its upper end in FIG. 2, the needle valve 29 is engaged by a flat plate 36 carried by a flexible diaphragm 37. The peripheral edge of this diaphragm is clamped between a flat, annular, outwardly-facing shoulder 38 on the sensing regulator housing 13a and a generally circular, rigid plate 39, which is dished outwardly away from the diaphragm 37 at the middle. A fluid pressure line 40 communicates with the chamber 41 formed between the plate 39 and the outer face of the diaphragm 37. As shown in FIG. 1, this line 40 at its opposite end communicates with the outlet side of a pump 42. An inlet line 43 leads into the pump from a suitable source of fluid (not shown).

The opposite end of the needle valve 29 (the lower end in FIG. 2) is positioned to be engaged by the offset end 44 of a spiral spring 45 mounted in the chamber 26 in the sensing regulator housing. The inner end of this spring is attached to a shaft 46, which extends rotatably through the end wall of the sensing regulator housing. By turning this shaft 46, the spring 45 can be tightened or relaxed depending upon the direction of such turning. Outside the housing, this shaft 46 carries a gear 47 which meshes with a reciprocable rack 48. With this arrangement, by adjusting the lengthwise position of the rack 48 the force which the offset end 44 of the spring 45 exerts against the needle valve can be adjusted selectively. The rack 48 may be adjusted lengthwise by any suitable means, which may be calibrated in terms of the corresponding speed of the driven shaft.

It will be apparent, that with the arrangement just described, the position of the needle valve 29 is under the conjoint control of the output pressure from the pump 42 and the opposing force of the spring 45.

The pump 42 has its operation controlled in response to the instantaneous speed of the driven shaft 11 as follows:

A sprocket 50 mounted directly on the driven shaft 11 is in meshing engagement with a chain 51 which, in turn, drives a sprocket 52. The latter is coupled through a magnetic clutch 53 to the input shaft 54 of a speed-increasing drive 55. The output shaft of the speed-increasing drive 55 is coupled to the rotor of the pump to control the latter's speed, and thus its output pressure. With this arrangement, the output pressure in line 40 from the pump 42 varies with the speed of the driven shaft 11.

The air outlet line 15 from the sensing regulator 13 is connected through a two-way valve X to a line 56 leading to the clutch 12. Line 56 is connected through a shut-off valve A to a line 57 connected to the interior of the air-operated clutch 12 through a rotating seal 58. A flow adjustment valve 59, which has free flow in the direction indicated by the arrow in FIG. 1, is connected in parallel with the valve A.

During the creep drive through the clutch 12, the air flow to clutch 12 is from the air supply 18 by way of line 22, the now-open valve B, the pressure regulator 23, the flow adjustment or metering valve 24, the sensing regulator 13, line 15, valve X, line 56, valve A, and line 57. The air pressure in the clutch 12 is under the control of the sensing regulator 13, which in turn is under the conjoint control of the spring 45 and the diaphragm 37 which operates in response to the output pressure of the pump 42. As already stated, the output pressure from the pump 42 is proportional to the instantaneous speed of the driven shaft 11.

Starting from a condition in which the driven shaft 11 is uncoupled from the drive shaft 10, the spring 45 will position the needle valve 29 so as to almost block off communication between the outlet line 15 and the exhaust line 16 and to establish the maximum communication between the air inlet line 14 and the air outlet line 15. Thus, initially air is fed into the clutch 12 at a rate determined primarily by the metering valve 24, with very little air being bled off to the exhaust line 16. As the air pressure in the clutch 12 builds up, its frictional coupling to the driven shaft 11 increases, thereby causing the driven shaft to rotate progressively faster. As the speed of the driven shaft increases, the pump 42 applies increasing pressure against the diaphragm 37 acting against the opposite end of the needle valve 29. As a result, the needle valve 29 tends to shift downward in FIG. 2, tending to reduce the communication between the inlet line 14 and the outlet line 15 and to increase the communication between the outlet line 15 and the exhaust line 16, so that the bleed off of air from the clutch to the exhaust line 16 increases. Soon a point is reached at which the sensing regulator 13 is bleeding off air from the clutch 12 (by way of line 57, flow control valve 59, line 56, valve X, line 15, valve outlet chamber 28, past the valve seat 33 into the chamber 26 in the sensing regulator housing 13a and thence to the exhaust outlet 16) faster than it is being supplied from the metering valve 24. As a consequence of this reduced air pressure in the clutch 12 there is increased slippage between the clutch and the driven shaft 11.

Soon the predetermined speed of the driven shaft 11 is reached at which the air pressure in the clutch 12 is constant by virtue of the fact that the sensing regulator 13 is bleeding off air to the exhaust line 16 at precisely the same rate as it is being fed in through line 14. This balanced condition is determined by the opposing actions of the spring 45, which is pre-set to establish this particular speed of the driven shaft, and the pump output pressure in line 40, which varies with the actual speed of the driven shaft 11.

Any tendency for the driven shaft 11 to run faster than this pre-set speed is positively avoided because such speed increase would be reflected as an increased pressure in line 40, tending to displace the needle valve 29 in the sensing regulator 13 so as to bleed off air faster from the clutch and thereby reduce the internal air pressure in the clutch and thus increase the slippage between the driving and driven shafts.

The final constant speed of the driven shaft 11 can be set to any desired value simply by setting the spring 45

(by means of rack 48) to apply the required force against the needle valve 29. Once the speed has been set by means of spring 45, the system functions automatically to positively prevent the driven shaft 11 from substantially exceeding this predetermined speed.

This precise control can be achieved regardless of the load on the driven shaft 11, so that even if this load should decrease rather abruptly to an extremely low load or zero load the driven shaft cannot "run away."

It has been found in practice that the present creep control drive system can provide virtually any desired reduced speed ratio between the driving and driven shafts and still achieve the precisely-controlled and automatic operation described.

The complete system in FIG. 1 also includes an air-operated brake 60 which is arranged to act against the driven shaft 11. In the illustrated embodiment this brake 60 is of the spring-set, air-released type.

During the creep drive this brake is supplied with air through a T-fitting 61 (connected just ahead of the pressure regulator 23), line 62, two-way valve Y, line 63, and a flow control valve 64 which provides free flow in the direction indicated by the arrow in FIG. 1.

When it is desired to provide the main, full speed drive through the clutch 12, valves A and B are closed. At this time, valve C is opened. This valve is connected between the air tank 21 and the two-way valve X. Valve X is moved to a position in which it establishes communication between valve C and line 56 leading to the air clutch by way of valve 59. Therefore, at this time the sensing regulator 13 is by-passed and full air pressure is applied to the clutch 12, so that the driven shaft 11 is driven at the same speed as the driving shaft 10. At this time, also, the valve Y is adjusted to a position in which it establishes communication between line 56 and the line 63 leading to the air-released brake 60.

While the present invention has its principal utility in connection with heavy duty, air-operated, friction clutches controlling the coupling between driving and driven members, its novel and advantageous principles may also be employed in a system where the speed of the driven member is controlled by a brake.

Also, the present creep drive control arrangement may be provided in a system where the clutch or brake is operated by a fluid other than air, such as a hydraulic liquid.

Accordingly, it is to be understood that, while there has been described in detail herein and illustrated in the accompanying drawings a particular, presently-preferred embodiment of the present invention, various modifications, omissions and refinements which depart from the disclosed embodiment may be adopted without departing from the spirit and scope of this invention.

What is claimed is:

1. In combination with a rotary driving member, a rotary driven member, and a fluid-operated friction clutch providing a variable friction coupling between said driving and driven members, the improvement which comprises means operated continuously by said driven member at all speeds of the latter for sensing the instantaneous speed of said driven member, fluid supply means for supplying pressure fluid to said clutch to control the degree of the friction coupling between said driving and driven members, and variable pressure control means connected in said fluid supply means and operated continuously by said sensing means at all speeds of said driven member to continuously vary the fluid pressure in said clutch inversely with the instantaneous speed of said driven member to limit the frictional coupling between said driving and driven shafts and thereby establish a predetermined speed of said driven member less than the speed of the driving member.

2. In combination with a rotary driving member, a rotary driven member, and an air-operated friction clutch providing a variable friction coupling between said driving and driven members, the improvement which comprises an air supply line for supplying air under pressure to said clutch to control the amount of friction coupling between said driving and driven members, valve means connected in said air supply line to selectively vary continuously the air pressure in said clutch, and means responsive to the instantaneous speed of said driven member at all speeds of the latter for producing a force acting against said valve means which is proportionate to the speed of said driven member at all speeds of the latter and which operates said valve means so as to vary the air pressure in said clutch inversely with the speed of said driven member to thereby limit the speed of said driven member to a value which is less than the speed of said driving member.

3. In combination with a rotary driving member, a rotary driven member, and an air-operated friction clutch connected between said driving and driven members, the improvement which comprises an air supply line for the clutch including a pressure regulator, a metering valve connected between said pressure regulator and the clutch and operable to limit the rate at which air flows to the clutch, a sensing regulator comprising control valve means having an inlet connected to receive air from said metering valve, a first outlet connected to the clutch and an exhaust outlet, adjustable means exerting a predetermined bias against said control valve means tending to establish a flow of air through said control valve means from said inlet to said first outlet, a pump driven at a speed which varies with the speed of said driven member and producing an output pressure proportionate to the speed of said driven member, and means for applying the output pressure of the pump against said control valve means in opposition to the bias exerted by said adjustable bias means so as to establish communication between said first outlet and said exhaust outlet and thereby bleed off air from the clutch to said exhaust outlet to limit the speed of said driven member to a value determined by said adjustable bias means.

4. The combination of claim 3 wherein said control valve means is operable, when the output pressure of the pump exceeds a certain value, to bleed off air from the clutch at a faster rate than the air passes through said metering valve.

5. The combination of claim 4 wherein said control valve means comprises a needle valve, said adjustable means is a torsion spring acting against the needle valve in one direction, and wherein said pump pressure applying means is a flexible diaphragm exposed on one side to the output pressure of the pump and on its opposite side acting against the needle valve in a direction opposite to the force exerted by said torsion spring.

6. In combination with a rotary driving member, a rotary driven member, and fluid-operated friction means providing a friction coupling between said driving and driven members which varies with the fluid pressure applied against said friction means, the improvement which comprises a metering valve connected to control the rate at which pressure fluid is supplied to said friction means, valve means communicating with said friction means and adjustable to bleed the pressure fluid therefrom, said valve means being adjustable to a position in which it bleeds the pressure fluid from said friction means faster than the pressure fluid is supplied through said metering valve, and means automatically controlling the adjustment of said valve means in accordance with the speed of said driven member to control the fluid pressure acting against said friction means and thereby regulate the speed of said driven member.

7. In combination with a rotary driving member, a rotary driven member, and a pressure fluid-operated friction clutch connected between said driving and driven members, the improvement which comprises a presure fluid supply line for the clutch including a metering valve operable to limit the rate at which pressure fluid flows to the clutch, a sensing regulator comprising control valve means having an inlet connected to receive pressure fluid from said metering valve, a first outlet connected to the clutch and a low pressure outlet, adjustable means exerting a predetermined bias against said control valve means tending to establish a flow of pressure fluid through said control valve means from said inlet to said first outlet, a pump driven at a speed which varies with the speed of said driven member and producing an output pressure proportionate to the speed of said driven member, and means for applying the output pressure of the pump against said control valve means in opposition to the bias exerted by said adjustable bias means so as to establish communication between said first outlet and said low pressure outlet and thereby bleed off pressure fluid from the clutch to said low pressure outlet to limit the speed of said driven member to a value determined by said adjustable bias means.

8. The combination of claim 7 wherein said control valve means is operable, when the output pressure of the pump exceeds a certain value, to bleed off pressure fluid from the clutch at a faster rate than the pressure fluid passes through said metering valve.

References Cited in the file of this patent

UNITED STATES PATENTS

| | | |
|---|---|---|
| 1,137,944 | Allen | May 4, 1915 |
| 1,424,325 | Thom | Aug. 1, 1922 |
| 2,095,779 | Whittington | Oct. 12, 1937 |
| 2,283,321 | Doe et al. | May 19, 1942 |
| 2,301,930 | Cattaneo | Nov. 17, 1942 |
| 2,606,456 | Dodge | Aug. 12, 1952 |
| 2,642,972 | Brooks | June 23, 1953 |
| 2,909,275 | Hitchcock | Oct. 20, 1959 |
| 2,922,594 | Pawlowski | Jan. 26, 1960 |
| 2,945,574 | Plume | July 19, 1960 |